(12) United States Patent
Kato (10) Patent No.: US 7,070,281 B2
(45) Date of Patent: Jul. 4, 2006

(54) LIGHT SOURCE DEVICE AND PROJECTION DISPLAY

(75) Inventor: Atsushi Kato, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 295 days.

(21) Appl. No.: 10/720,104

(22) Filed: Nov. 25, 2003

(65) Prior Publication Data

US 2004/0109329 A1    Jun. 10, 2004

(30) Foreign Application Priority Data

Dec. 4, 2002    (JP)    ............................ 2002-353004

(51) Int. Cl.
G03B 21/14    (2006.01)

(52) U.S. Cl. ............................. 353/20; 353/33; 349/8; 359/634; 362/231

(58) Field of Classification Search ................ 353/20, 353/31, 33, 34, 37, 94; 349/5, 7, 8, 9; 362/231; 345/39, 44, 46, 82; 348/742, 743, 771; 359/634
See application file for complete search history.

(56) References Cited

U.S. PATENT DOCUMENTS

| 6,038,005 | A  * | 3/2000 | Handschy et al. | ............. | 349/61 |
| 6,336,724 | B1 * | 1/2002 | Shouji et al. | ................. | 353/20 |
| 6,409,349 | B1 * | 6/2002 | O'Connor | ..................... | 353/31 |
| 6,447,120 | B1 * | 9/2002 | Hansen et al. | ................ | 353/20 |
| 6,623,122 | B1 * | 9/2003 | Yamazaki et al. | ............ | 353/30 |
| 6,726,329 | B1 * | 4/2004 | Li et al. | ........................ | 353/20 |
| 6,769,772 | B1 * | 8/2004 | Roddy et al. | ................. | 353/31 |
| 2005/0200812 | A1 * | 9/2005 | Sakata et al. | ................ | 353/20 |
| 2005/0219464 | A1 * | 10/2005 | Yamasaki et al. | ............. | 353/20 |

FOREIGN PATENT DOCUMENTS

| JP | 6-141262 | 5/1994 |
| JP | 11-015399 | 1/1999 |
| JP | 11-065477 | 3/1999 |
| JP | 2000-56410 | 2/2000 |
| JP | 2001-249400 | 9/2001 |
| JP | 2002-228973 | 8/2002 |
| JP | 2002-244211 | 8/2002 |

* cited by examiner

Primary Examiner—William C. Dowling
(74) Attorney, Agent, or Firm—Young & Thompson (57) ABSTRACT

A light source device which employs a plurality of light emitting diodes for emitting different colors of light, and a projection display which incorporates the light source device provide for a good white balance and a high light utilization efficiency in consideration of light emission efficiencies inherent to the respective color light emitting diodes. An illumination beam from each of light emission boards is converted to one type of polarized light respectively by associated polarized light forming means, and resulting polarized light beams are combined by a polarizing beam splitter to produce an illumination beam for illuminating a two-dimensional image device which may comprise a digital mirror device (DMD). The light emitting diodes in the respective colors are arranged on respective light emission boards in a predetermined ratio of distribution to optimize the white balance.

4 Claims, 8 Drawing Sheets

LIGHT SOURCE DEVICE AND PROJECTION DISPLAY

BACKGROUND OF THE INVENTION

1. Field of the Invention

The present invention relates to a light source device and a projection display, and more particularly to a light source device which employs a plurality of light emitting diodes for a light source, and a projection display which incorporates the light source device.

2. Description of the Related Art

Conventional projection displays typically comprise a light source using a single high-pressure mercury lamp which irradiates an illumination beam therefrom to three or one two-dimensional image device for modulating an image. The modulated image is enlarged and displayed on a screen using a projection lens. The high-pressure mercury-arc lamp, which serves as the light source, is a white lamp that has light emission characteristics from an ultraviolet region to an infrared region, and a dichroic mirror, a rotary color filter, or the like is used to select wave-length components of R (red), G (green), B (blue) light required for color display from the white light, for irradiating the two-dimensional image device with the selected light components. Known two-dimensional image devices include a transmission-type and a reflection-type liquid crystal panel, a digital mirror device (DMD), and the like. The foregoing conventional projection display employs a relatively large lamp for the light source because it is generally used in combination with a parabolic or an elliptic reflection mirror. In addition, due to large amount of heat generated by the light source itself, a cooling fan must be used to manage the temperature of the lamp and a cooling condition for the two-dimensional image device when the lamp is on. These requirements make it difficult to reduce the size and weight of the overall display.

JP-2001-249400-A discloses techniques for solving the drawbacks of the conventional projection display. The disclosed techniques involve arranging light emitting diodes or laser diode elements in matrix for use as light sources, instead of a high-pressure mercury-arc lamp. Then, each of the light sources is associated with each elemental lens of a pair of lens arrays to construct an optical system which can efficiently irradiate a two-dimensional image device with illumination beams from the individual light emitting elements. The two-dimensional image device is implemented by a transmission-type liquid crystal panel. The employment of light emitting diodes or laser diode elements for the light sources contributes to the accomplishment of a reduction in the size and weight of the overall display as well as a saving in power consumption of the light sources.

Figure 1:
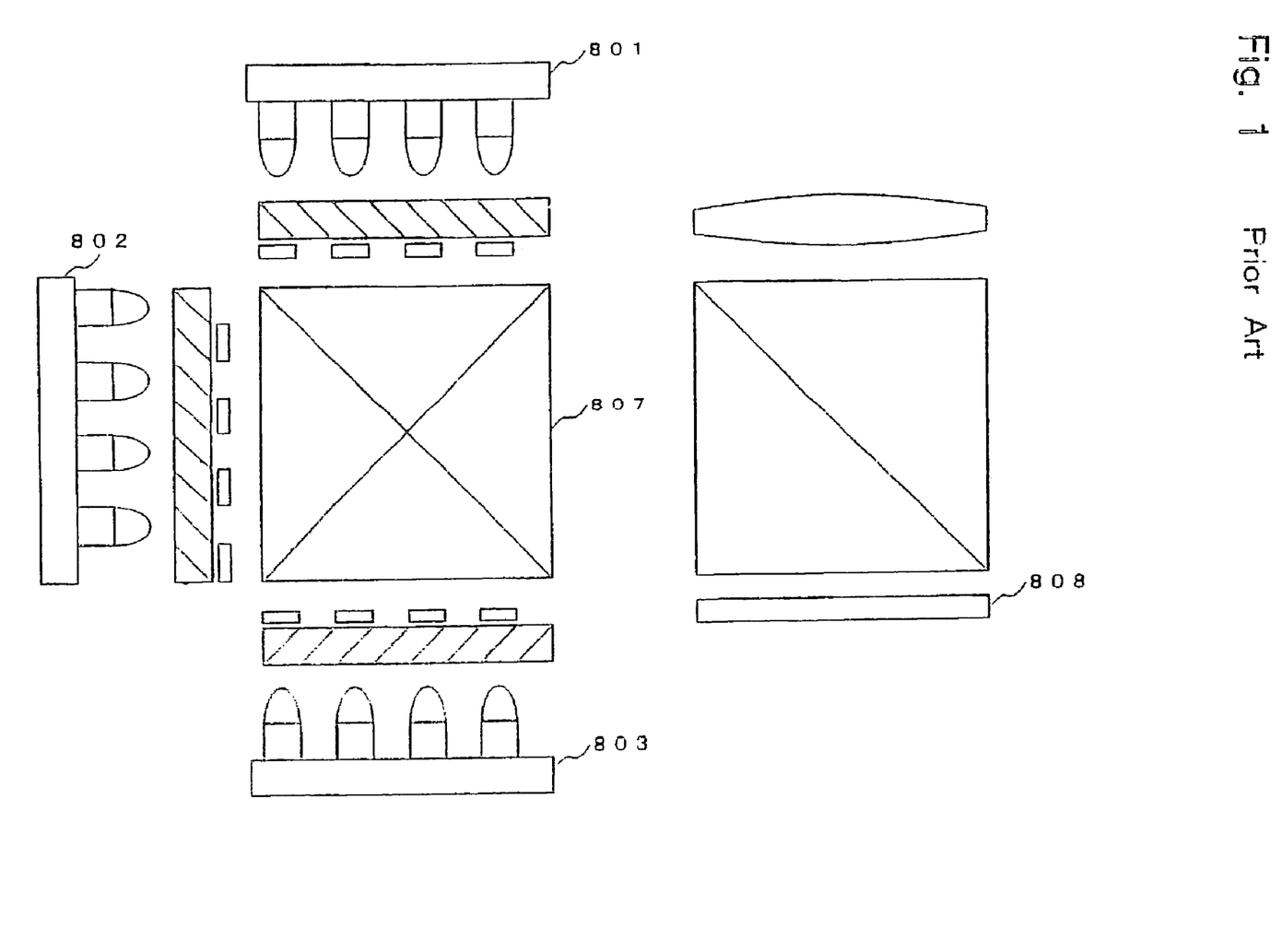
FIG. 1 is a schematic block diagram for describing a conventional light source device which employs a cross dichroic mirror.

Likewise, JP-2002-244211-A and JP-2002-56410-A disclose techniques for solving the drawbacks of the conventional projection display. As illustrated in FIG. 1, the disclosed techniques involve chromatically combining illumination beams from R, G, B light emitting diode boards 801, 802, 803 with cross dichroic prism 807 for use in illumination of single two-dimensional image device 808. The advantage provided by these techniques is the ability to make an illumination system compact even if a relatively large number of light emitting diodes are used.

However, a light source composed of light emitting diodes or laser diodes, as in the aforementioned prior art examples, disadvantageously fails to commercially provide a projection display bright enough for practical use due to a lack of luminance produced by each light emitting element. To solve the lack of luminance, it is desirable to use the largest possible number of light emitting diodes.

Particularly, when a dichroic mirror is used in a projection display as disclosed in JP-2002-244211-A and JP-2000-56410-A, a limitation is imposed to locations available for disposing R, G, B light emitting diodes, giving rise to the following problems.

Generally, light emitting diodes differ in the light emission efficiency from one another depending on luminescent colors emitted thereby. In other words, even those light emitting diodes in the same family which are identical in chip size, shape and the like, differ from one another in the luminance produced thereby. Giving as an example high-luminosity light emitting diodes at a standard luminosity rank made by Nichia Corporation, a red light emitting diode (model number: NSPR346BS) provides 0.305 candelas of luminosity; a blue light emitting diode (model number: NSPB346BS), 0.5 candelas; and green light emitting diode (model number: NSPG346BS), 1.73 candelas. Giving another example, the Luxeon series made by Lumileds Lighting, Inc. in U.S.A. includes a red light emitting diode (model number: LXHL-BD01) which provides 25 lumens; a blue light emitting diode (model number: LXHL-BB01) which provides 5 lumens; and a green light emitting diode (model number: LXHL-BM01) which provides 25 lumens. Such variations in luminance is thought to result from the materials of the light emitting elements, and the like.

Figure 2:
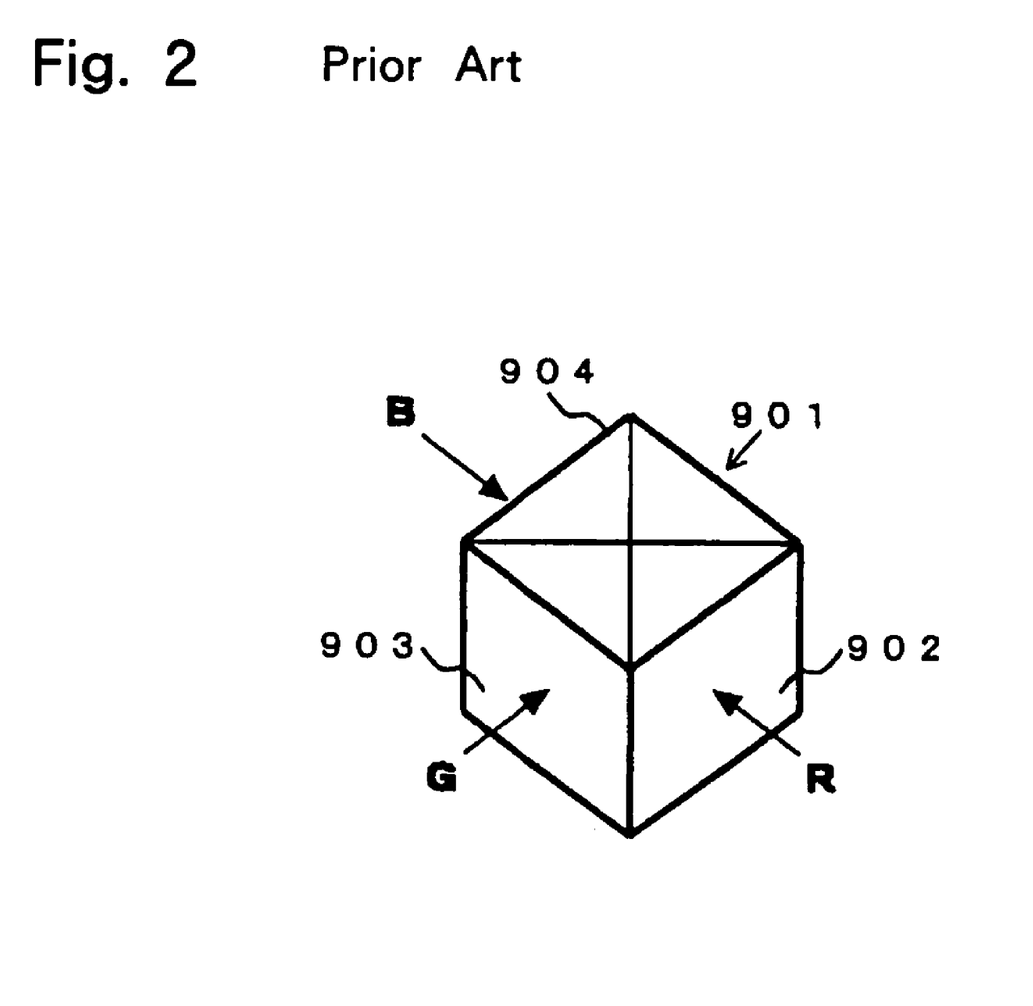
FIG. 2 is a schematic perspective view of the cross dichroic mirror in FIG. 1.

FIG. 2 illustrates an outer appearance of cross dichroic prism 901 mentioned above. When using cross dichroic prism 901, as many light emitting diodes as possible are ideally provided in each of R, G, B channels 902, 903, 904. Cross dichroic prism 901 has incident surfaces for the respective channels which have the same dimensions, so that a maximum number of available light emitting diodes is also the same for the respective channels. While a total light amount is maximized by providing the maximum number of light emitting diodes in each channel, the light emitting diodes differ in optical power from one color to another, so that for ensuring a predetermined white balance, the maximum number is actually limited by a light emitting diode of a particular color, and a less number of light emitting diodes can merely be provided in the other channels. Even if the same number of light emitting diodes are provided in the respective channels, all the light emitting diodes cannot be used in such a manner that the maximum optical power can be produced in each of the channels.

Specifically, NTSC (National Television Standards Code) defines the light amount ratio of R, G, B, which make up white at approximately 3:6:1. Accordingly, with the light emitting diodes made by Nichia Corporation, the light emitting diodes of the R, G, B colors should be provided at the ratio of 2.8:1:0.57, i.e., 2.8 of R light emitting diodes and 0.57 of B light emitting diodes for one G light emitting diode. In other words, the R-channel requires light emitting diodes 2.8 times more than those required by the G-channel, while the B-channel requires light emitting diodes 0.56 times more than those required by the G-channel. With the Luxeon series made by Lumileds Lighting, Inc. in U.S.A., the ratio is such that 0.5 of R light emitting diodes and 0.83 of B light emitting diodes are required for one G light emitting diode. For this reason, even if a cross dichroic prism is specially used in favor of a reduction in size, a resulting display disadvantageously suffers from an insufficient light utilization efficiency because it cannot utilize the maximum power from the maximum number of available light emitting diodes provided in each channel.

SUMMARY OF THE INVENTION

The present invention has been made to solve the drawbacks of the prior art mentioned above, and it is an object of the invention to provide a light source device and a projection display which exhibit a good white balance and a high light utilization efficiency in consideration of the light emission efficiencies inherent to individual light emitting diodes.

The invention is intended to provide a light source device which is advantageous in the arrangement of light emitting diodes over the conventional light source device using a cross dichroic mirror, realizes an ideal white balance and a high light utilization efficiency, and further improves the light utilization efficiency through polarization conversion of illumination beams, which are randomly polarized light, from the light emitting diodes.

The invention also is intended to provide a light source device which can be significantly reduced in size.

The invention is further intended to provide a light source device which can be further reduced in weight.

The invention is yet further intended to provide a light source device in which the light emitting diodes can be arranged in closer proximity to one another.

The invention is still further intended to provide a projection display which employs any of these light source devices to enable the generation of a brighter projection image which excels in color rendering properties.

To achieve the above objects, the light source device includes two or more light emission boards each having three types of light emitting diodes for emitting red, green, and blue light, arranged in matrix in a predetermined ratio, polarized light forming means each opposing the light emission board associated therewith for receiving illumination beams of randomly polarized light emitted from the respective light emitting diodes, uniformly converting the illumination beams to the same type of linearly polarized light, and directing the linearly polarized light beam therefrom, and illumination beam combining means for transmitting or reflecting the incident linearly polarized light beams depending on the type of polarized light to combine the incident linearly polarized light beams orthogonal to each other into a single direction for emission therefrom.

The illumination beam combining means includes a polarized light separation surface formed therein and extending at 45° to the optical axis of the incident light beam, wherein the illumination beam combining means relies on the action of the polarized light separation surface which transmits or reflects polarized light incident thereon depending on the type of the polarized light to combine the incident light beams orthogonal to each other into a single direction for emission therefrom.

The polarized light separation surface is formed in a V-shape within the illumination beam combining means.

The illumination beam combining means comprises a wire grid type polarizer.

The light source device further includes illumination beam converging means disposed between each of the light emission boards and each of the polarized light forming means for converging the illumination beams of the randomly polarized light emitted from the light emitting diodes.

The projection display for projecting an image on a projection surface has a light source device and illumination beam modulating means for modulating an illumination beam emitted from the light source device to generate a projection image for display on a projection surface, wherein the light source device comprises two or more light emission boards each having three types of light emitting diodes for emitting red, green, and blue light, arranged in matrix in a predetermined ratio, polarized light forming means each opposing the light emission board associated therewith for receiving illumination beams of randomly polarized light emitted from the respective light emitting diodes, uniformly converting the illumination beams to the same type of linearly polarized light, and directing the linearly polarized light beam therefrom, and illumination beam combining means for transmitting or reflecting the incident linearly polarized light beams depending on the type of polarized light to combine the incident linearly polarized light beams orthogonal to each other into a single direction for emission therefrom, and the illumination beam modulating means comprises a digital mirror device (DMD).

The above and other objects, features, and advantages of the present invention will become apparent from the following descriptions based on the accompanying drawings which illustrate preferred embodiments of the present invention.

DETAILED DESCRIPTION OF THE PREFERRED EMBODIMENTS

In the following, the present invention will be described in connection with several embodiments thereof with reference to the accompanying drawings.

(First Embodiment)

Figure 3:
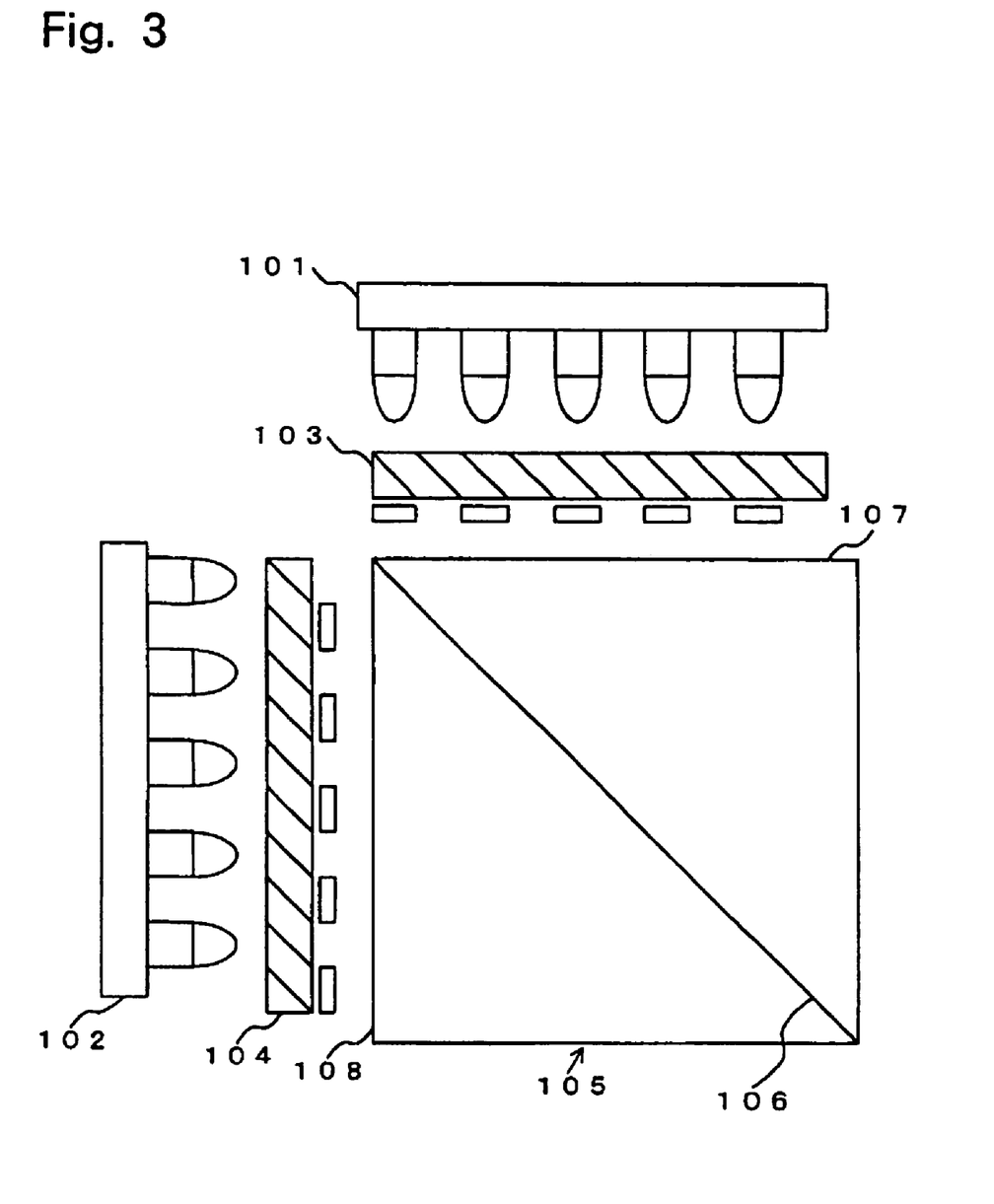
FIG. 3 is a schematic block diagram of a light source device for describing a first embodiment of the present invention.

FIG. 3 is a schematic diagram illustrating a first embodiment of a light source device. In FIG. 3, reference numerals 101, 102 designate light emission boards on which a plurality of light emitting diodes are two-dimensionally arranged. Reference numerals 103, 104 designate polarized light forming means. Reference numeral 105 designates a polarizing beam splitter.

Randomly polarized light emitted from the light emitting diodes on light emission boards 101, 102 is uniformly converted to P-polarized light or S-polarized light by polarized light forming means 103, 104 before it is incident on polarizing beam splitter 105. An illumination beam emitted from the light emitting diodes on light emission board 101 and uniformly converted to S-polarized light is reflected on polarized light separation surface 106 of polarizing beam splitter 105, and exits from polarizing beam splitter 105. On the other hand, an illumination beam emitted from the light emitting diodes on light emission board 102 and uniformly converted to P-polarized light transmits polarized light separation surface 106 of polarizing beam splitter 105, and then joins the S-polarized light emitted from light emission board 101.

Here, each of the light emitting diodes has a light emitting element made of a GaP-based, a GaAsP-based, or a GaAlAs-based material which is generally encapsulated by an optically transparent thermosetting resin which in turn has a lens surface through which light is emitted from the light emitting element. Preferably, the lens for use in the light emitting diode has a predetermined shape which gives strong parallelism to an illumination beam emitted therethrough. The illumination beam from such a light emitting diode can be collimated using a known prior art technique.

Figure 8:
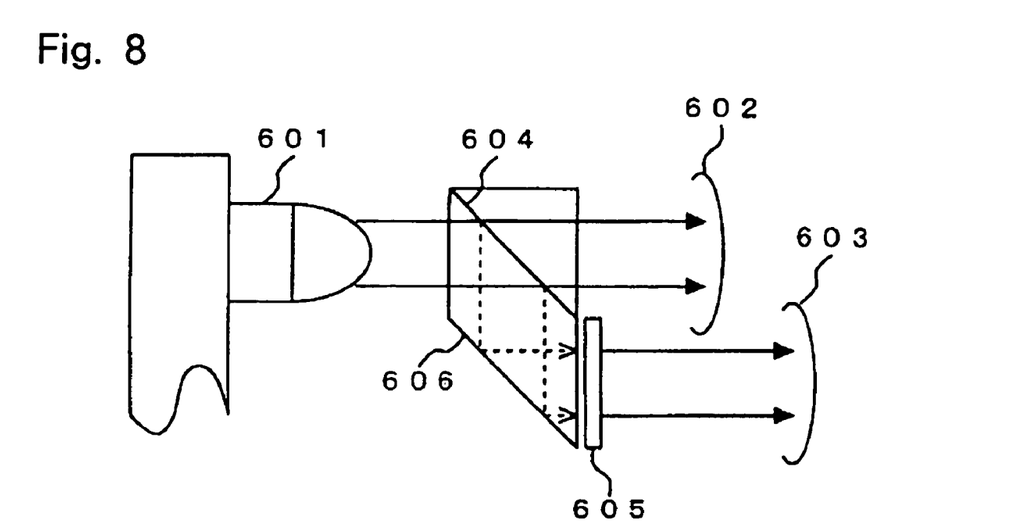
FIG. 8 is a schematic diagram for describing a polarized light forming means for emitting P-polarized light.
Figure 9:
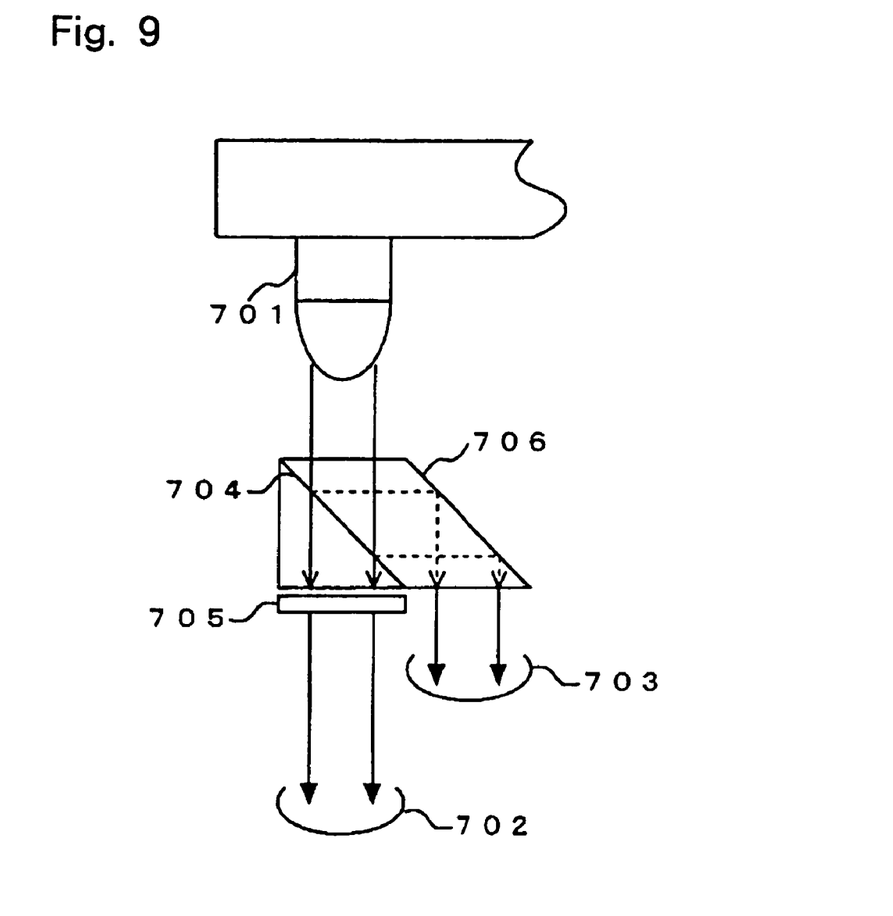
FIG. 9 is a schematic diagram for describing a polarized light forming means for emitting an S-polarized light.

Each of polarized light forming means 103, 104 may be comprised of a plurality of polarizing beam splitters and reflectors, and a half-wave plate, as illustrated in FIGS. 8 and 9. Polarized light forming means 103, 104 differ in the position at which the half-wave plate is placed such that polarized light forming means 103 uniformly converts an illumination beam from light emission board 101 to S-polarized light, while polarized light forming means 104 uniformly converts an illumination beam from light emission board 102 to a P-polarized light, in order to be compatible with the polarized light separation/combination characteristics of polarizing beam splitter 105 which subsequently joins the illumination beams from polarized light forming means 103, 104.

Specifically, referring to FIG. 8, randomly polarized light from light emitting diode 601 includes a P-polarized light component which transmits polarized light separation surface 604 and exits as it is from a polarizing beam splitter, as indicated by illumination beam 602. An S-polarized light component reflected from polarized light separation surface 604 is reflected by reflective surface 606 which has been processed to have a reflective mirror, by way of example, and converted by half-wave plate 605 to P-polarized light 603 which exits from half-wave plate 605.

When half-wave plate 705 is placed at a different position as illustrated in FIG. 9, a P-polarized light component which transmits polarized light separation surface 704 is converted by half-wave plate 705 to S-polarized light 702 which exits from half-wave plate 705. An S-polarized light component reflected from polarized light separation surface 704 is reflected by reflective surface 706 which been processed to have a reflective mirror, and exits as it is from a polarized beam splitter, as indicated by illumination beam 703. In this way, emitted illumination beams 702, 703 can be uniformly converted to S-polarized light.

A polarizing beam splitter for joining the illumination beams from light emission boards 101, 102, which have been uniformly converted to P-polarized light and S-polarized light, respectively, may be implemented, for example, by a beam splitter made of optical glass and composed of two right-angled prisms adhered to each other and formed with a dielectric multi-layer film on one of sloping surfaces for separating randomly polarized light substantially in a ratio of 1:1 for a visible light wave-length range. Since polarizing beam splitter 105 combines illumination beams from a plurality of light emission boards which serve as light sources, light emitting diodes in any of R, G, B colors can be arbitrarily arranged to make up light emission boards 101, 102. Specifically, optimal numbers of R, G, B light emitting diodes can be distributed in an area of 2S in total, where S represents the area of incident surfaces 107, 108 of polarizing beam splitter 105, in consideration of the optical power of the respective R, G, B light emitting diodes used herein.

(Second Embodiment)

Figure 4:
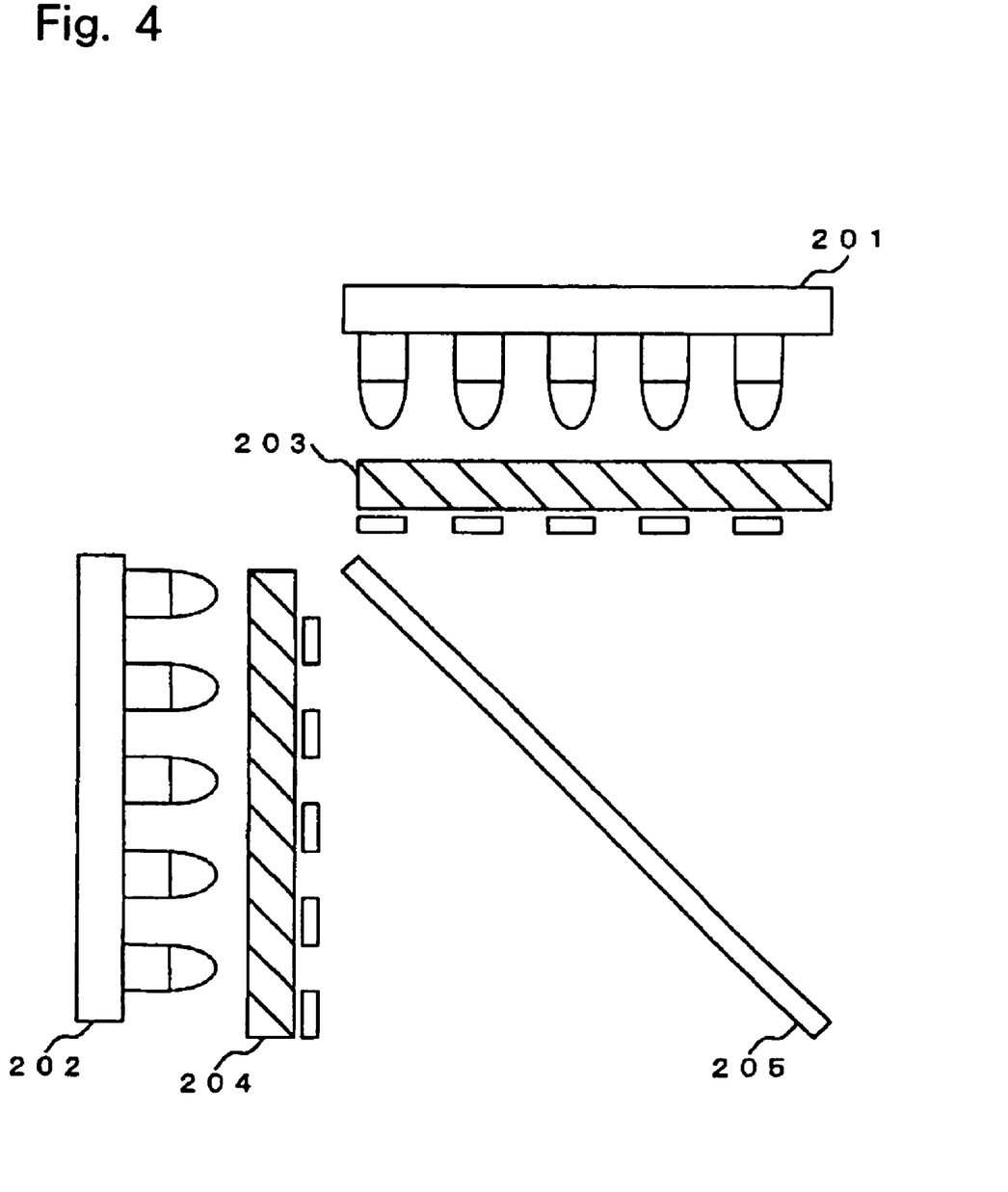
FIG. 4 is a schematic block diagram of a light source device for describing a second embodiment of the present invention.

FIG. 4 is an explanatory diagram for a second embodiment which illustrates an exemplary modification to the light source device described in the first embodiment. The second embodiment differs from the first embodiment in that wire grid type polarizer 205 is used for combining illumination beams from two light emission boards 201, 202 in FIG. 4.

Known wire grid type polarizers include ProFlux (registered trademark) from MOXTEK Inc., U.S.A., and the like. ProFlux (registered trademark) is a grid type polarizer which has a fine Al grid formed on a glass substrate, which has a width of approximately 65 nm, a height of 100–200 nm, and a pitch of approximately 140 nm, and transmits a polarized light component of randomly polarized light incident thereon in a vibrating direction orthogonal to the longitudinal direction of the grid, and reflects a polarized light component in a vibrating direction parallel with the longitudinal direction of the grid. This type of polarizer is advantageous over polarizing beam splitter 105 made of optical glass in the first embodiment in that the resulting light source device is significantly reduced in weight, as compared with the counterpart of the first embodiment.

Randomly polarized light emitted from light emitting diodes arranged on light emission boards 201, 202 is uniformly converted by polarized light forming means 203, 204 to P-polarized light or S-polarized light which is incident on wire grid type polarizer 205. An incident beam from light emission board 201, uniformly converted to S-polarized light, is reflected by and emitted from wire grid type polarizer 205. On the other hand, an illumination beam from light emission board 202, uniformly converted to P-polarized light, transmits wire grid type polarizer 205, and joins the S-polarized light which is reflected from wire grid type polarizer 205.

(Third Embodiment)

Figure 5:
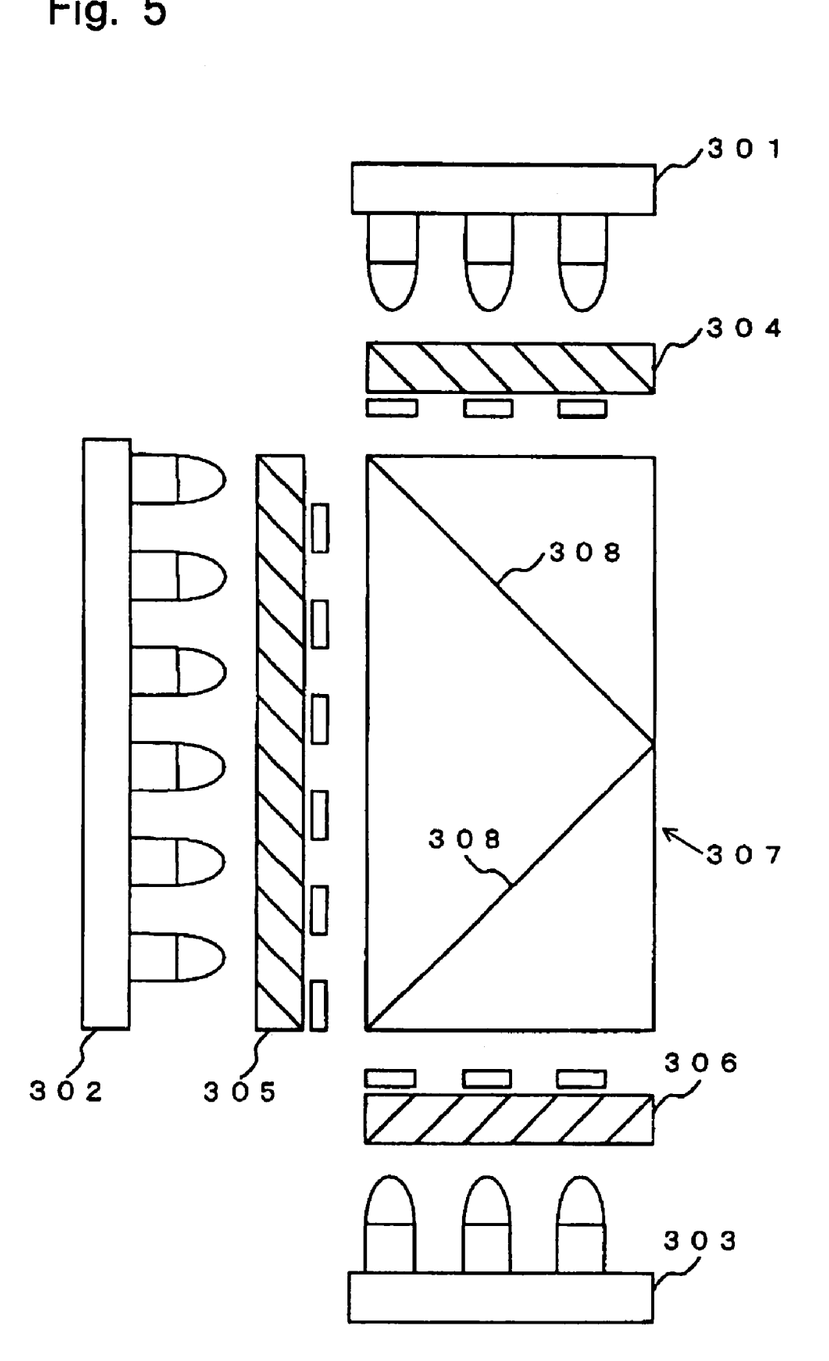
FIG. 5 is a schematic block diagram of a light source device for describing a third embodiment of the present invention.

FIG. 5 is an explanatory diagram for a third embodiment which illustrates another exemplary modification to the light source device described in the first embodiment. The third embodiment differs from the first embodiment in that a light source device in FIG. 5 comprises three light emission boards 301, 302, 303, and polarizing beam splitter 307 having a V-shaped polarized light separation surface 308 for combining illumination beams from three light emission boards 301, 302, 303. The resulting light source device is reduced in volume to one half, and therefore is much smaller than the light source device of the first embodiment which employs polarizing beam splitter 105.

Randomly polarized light emitted from light emitting diodes arranged on light emission boards 301, 302, 303 is uniformly converted by polarized light forming means 304, 305, 306, respectively, to P-polarized light or S-polarized light which is incident on polarizing beam splitter 307. Illumination beams from light emission boards 301, 303, uniformly converted to S-polarized light, are reflected by polarized light separation surface 308 of polarizing beam splitter 307 and exit from polarizing beam splitter 307. On the other hand, an illumination beam from light emission board 302, uniformly converted to P-polarized light, transmits polarized light separation surface 308 of polarizing beam splitter 307, and joins the S-polarized light emitted from light emission boards 301, 303.

(Fourth Embodiment)

Figure 6:
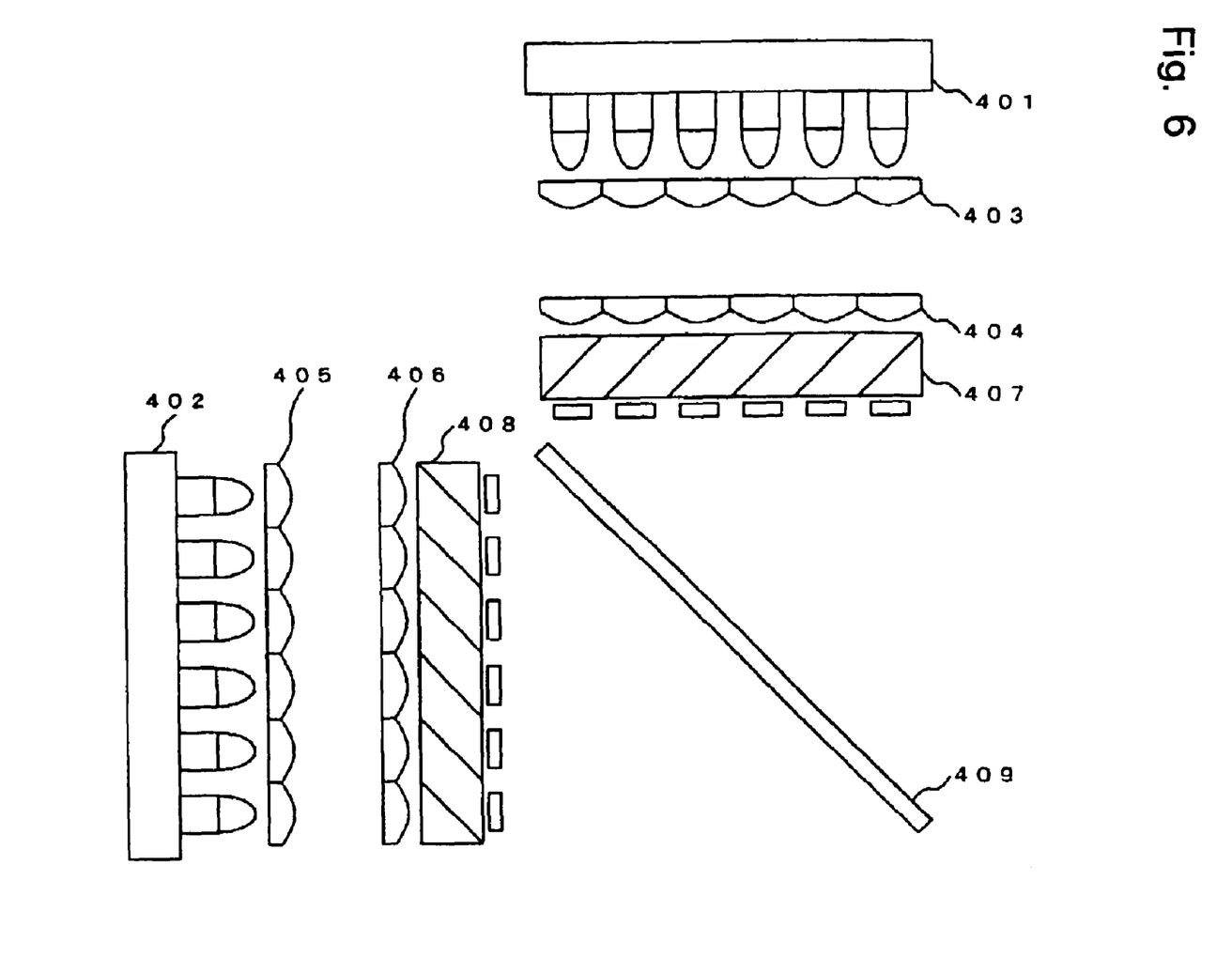
FIG. 6 is a schematic block diagram of a light source device for describing a fourth embodiment of the present invention.

FIG. 6 is an explanatory diagram for a fourth embodiment, which illustrates a further exemplary modification to the light source device described in the first embodiment. The light source devices in the first to third embodiment are configured on the assumption that substantially collimated illumination beams from the light emitting diodes are incident on polarized light forming means 103, 104, 203, 204, 304, 305, 306, with the result that the cross section of the illumination beam is doubled after the polarization conversion, as can be seen in FIGS. 8, 9. Therefore, the light emitting diodes arranged on the light emission boards must be spaced apart from one another, and accordingly cannot be packed in close proximity. For increasing the density of the illumination beam emitted from the light source device, a largest possible number of light emitting diodes are desirably arranged on each light emitting board, and for this purpose, pairs of lens arrays 403, 404 and 405, 406 are interposed between light emission boards 401, 402 and polarized light forming means 407, 408, respectively, in the configuration illustrated in FIG. 6.

Substantially collimated illumination beams emitted from the light emitting diodes on light emission boards 401, 402 are first incident on lens arrays 403, 405 closer to the light emitting diodes, and resulting converged light is incident on lens arrays, 404, 406 closer to polarized light forming means 407, 408. Since the diameters of the illumination beams are smaller immediately after they exit from lens arrays 404, 406 than those when the illumination beams are incident on lens arrays 403, 405, the light emitting diodes can be arranged in close proximity to one another by disposing polarized light forming means 407, 408 adjacent to lens arrays 404, 406. Consequently, a larger number of light emitting diodes can be used to increase the optical power of the light source device. It should be noted that in the fourth embodiment, the illumination beams emitted from polarized light forming means 407, 408 are divergent. Accordingly, the illumination beams from light emission boards 401, 402 are combined using wire grid type polarizer 409 which excels in the polarized light separation characteristic for divergent illumination beams. However, a polarized beam splitter may be used instead for combining such illumination beams.

(Fifth Embodiment)

Figure 7:
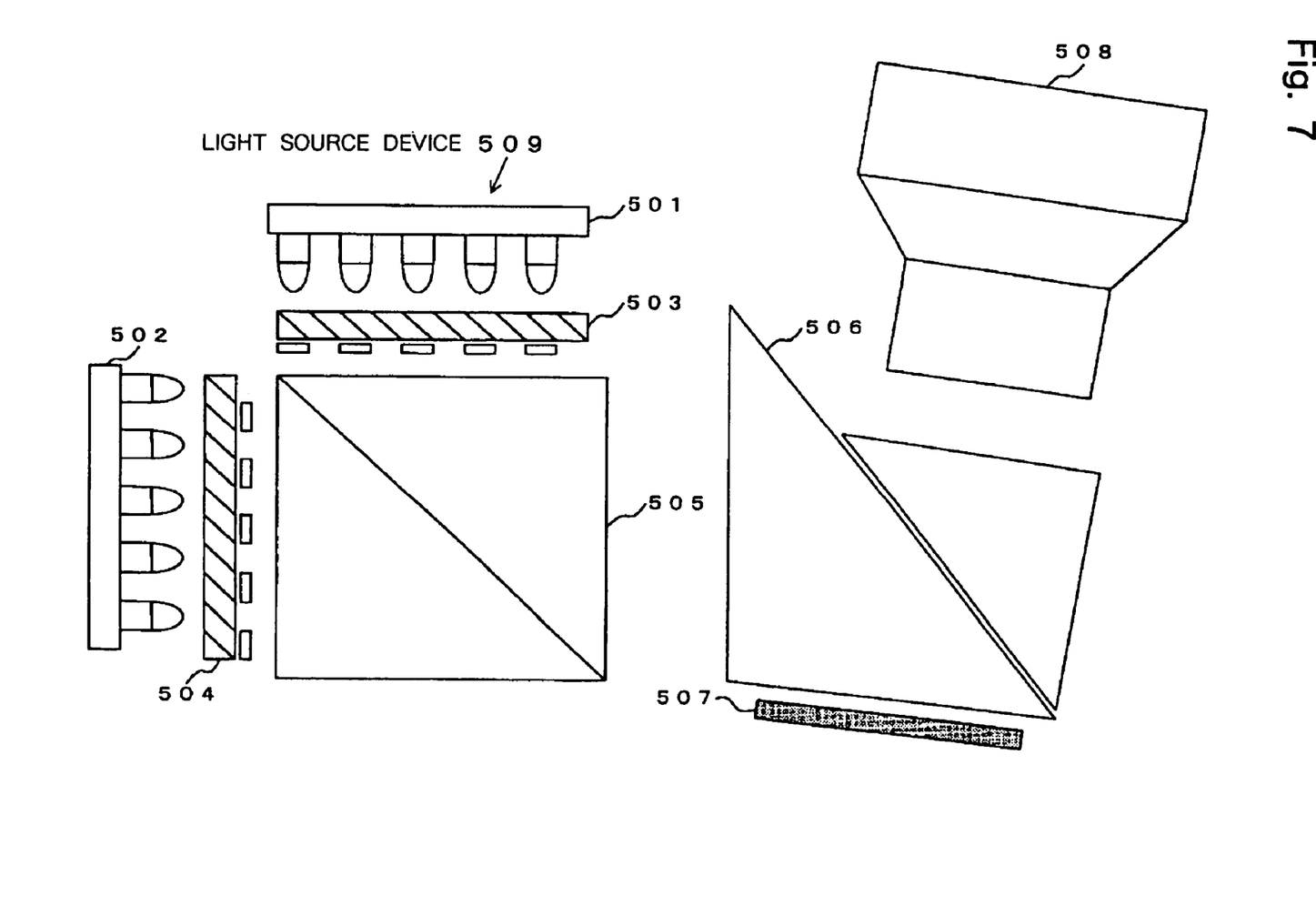
FIG. 7 is a schematic diagram illustrating the configuration of a projection display which employs the light source device according to the first embodiment of the present invention, for describing a fifth embodiment of the present invention.

FIG. 7 is a schematic diagram illustrating the configuration of a projection display which employs the light source device of the present invention, according to a fifth embodiment. The projection display according to the fifth embodiment is comprised of light source device 509; DMD 507 which functions as a two-dimensional image device; projection lens 508; and prism 506 for leading an illumination beam to DMD 507. Light source device 509 used herein is identical in configuration to that shown in the first embodiment. The two-dimensional image device is preferably implemented by DMD because it can form an image independently of polarized light. Alternatively, the projection display can of course employ a transmission-type polysilicon TFT liquid crystal which uses a single linear polarized light component, a reflection-type Lcos panel, and the light though they are inferior in the luminance eventually provided on the screen.

Illumination light from light source device 509, which is provided with the respective numbers of R, G, B light emitting diodes in such a ratio that optimizes the optical power and white balance, is irradiated to DMD 507 through prism 506, and an image modulated by DMD 507 is enlarged and projected onto a screen, not shown, by projection lens 508. Here, the illumination beam emitted from light source device 509 reaches DMD 507 as a mixture of P-polarized light and S-polarized light. Light source device 509 can provide bright projection images excellent in color rendering properties at a high light utilization efficiency because optimized numbers of R, G, B light emitting diodes are arranged on respective light emission boards 501, 502 in consideration of white balance, and the resulting illumination beam emitted therefrom is utilized to illuminate DMD 507.

In the fifth embodiment, the projection display employs light source device 509 which has been described in connection with the first embodiment, but alternatively, the projection display can of course employ any of the light source devices described in connection with the second to fourth embodiments.

As is apparent from the foregoing description, the present invention provides a light source device for irradiating a two-dimensional image device with light from a light source, and a projection display for displaying an image produced by the two-dimensional image device enlarged by a projection lens, wherein the light source device is characteristically composed of a plurality of light emitting diodes arranged in matrix for emitting red, blue, and green light which are combined by a polarizing beam splitter. Since the numbers of R, G, B light emitting diodes arranged on light emission boards as a light source can be set in an arbitrary ratio, the present invention can provide a light source device and a projection display which exhibit a good white balance and a high light utilization efficiency in consideration of light emission efficiencies inherent to light emitting diodes of different colors even though they differ in the optical power depending on the luminescent colors emitted thereby, as those currently available on the market.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A light source device comprising:
   at least two light emission boards that each have light emitting diodes that emit red, green, and blue light;
   polarized light formers that each oppose a respective different one of said light emission boards and that receive respective beams of randomly polarized light emitted from said light emitting diodes, at least one of said polarized light formers converting the respective beam to a first type of linearly polarized light and at least one of said light formers converting the respective beam to a second type of linearly polarized light orthogonal to the first type, said polarized light formers emitting polarized light beams therefrom; and
   a V-shaped polarized light combiner with two light receiving surfaces at 45° to optical axes of the incident polarized light beams, said light receiving surfaces transmitting or reflecting the polarized light beams incident thereon depending on the type of the polarized light, said combiner combining the incident polarized light beams into a single direction for emission therefrom.

2. The light source device according to claim 1, wherein said combiner comprises a wire grid type polarizer.

3. The light source device according to claim 1, further comprising beam lens arrays disposed between respective pairs of said light emission boards and said polarized light formers.

4. The light source device according to claim 1 in a projector having a digital mirror that modulates light emitted from the device to generate a projection image.

* * * * *